M. K. MILLER.
ELECTRIC INCUBATOR.
APPLICATION FILED MAR. 27, 1915.
1,289,510.
Patented Dec. 31, 1918.
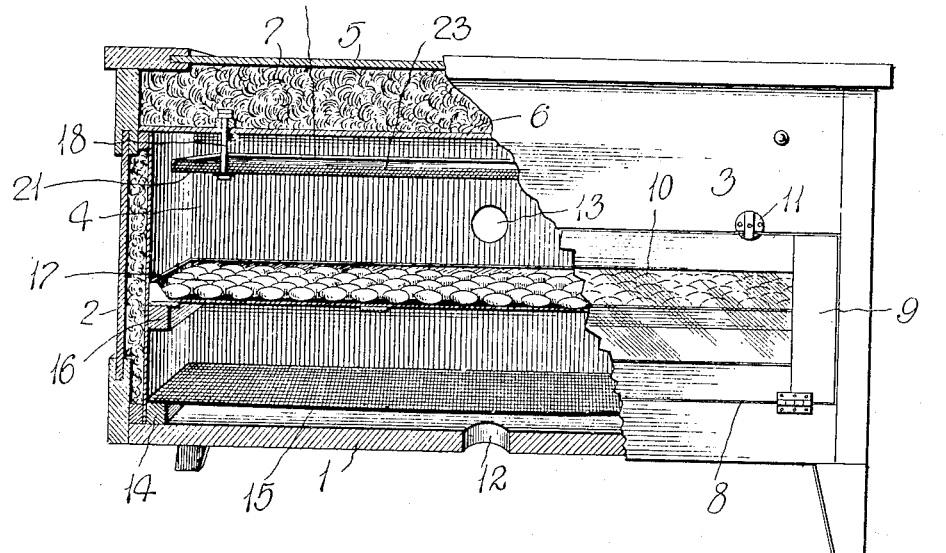
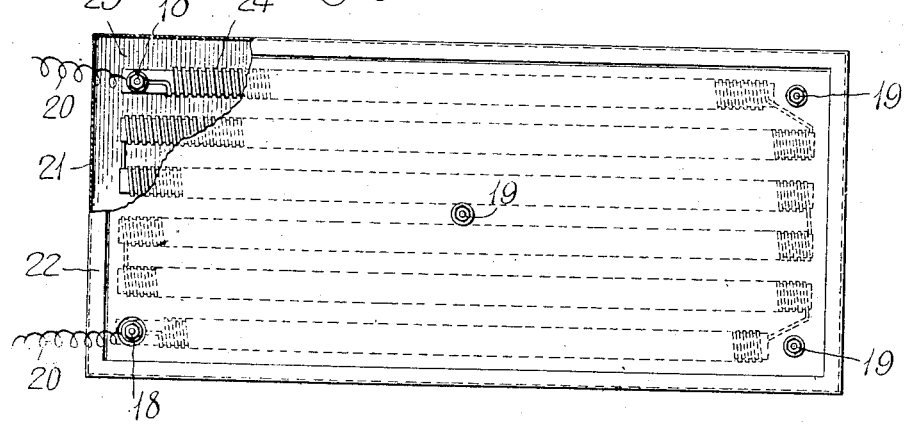
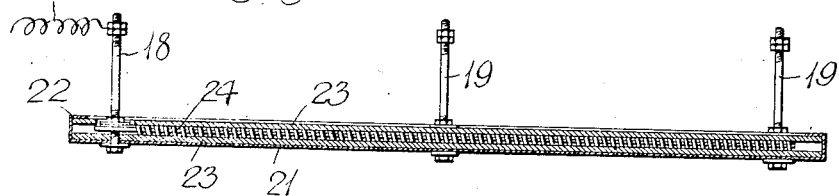
Inventor
Max K. Miller,
Witnesses
Chas. W. Stauffiger
Karl H. Butler
By
Attorneys

UNITED STATES PATENT OFFICE.

MAX K. MILLER, OF DETROIT, MICHIGAN.

ELECTRIC INCUBATOR.

1,289,510.  Specification of Letters Patent.  Patented Dec. 31, 1918.

Application filed March 27, 1915. Serial No. 17,338.

*To all whom it may concern:*

Be it known that I, MAX K. MILLER, a citizen of the United States of America, residing at Detroit, in the county of Wayne and State of Michigan, have invented certain new and useful Improvements in Electric Incubators, of which the following is a specification, reference being had therein to the accompanying drawings.

Successful poultry culture requires close attention of every detail, and to eliminate the antiquated attention to lamps and all worry as to an even temperature, I have devised an incubator wherein electricity is utilized as a heating agent. The heating agent is in the form of a flat unit suspended within the incubator above the egg tray and covers the entire area of the tray, insuring even temperature for each egg in the tray. With other types where heat is generated at four or six points, generally by the aid of lamps, uniform temperature cannot be had for all eggs, and by using lamps considerable time is required to fill the same, trim the wicks, with a possible danger of explosion and the killing of the embryo of an egg by accidentally allowing a bit of kerosene oil to contact with an egg. Besides the obnoxious fumes there are other troubles encountered by using lamps, and to obviate the trouble heretofore experienced I have devised an incubator, wherein the parts are constructed with a view of reducing the cost of manufacture and at the same time retain the features by which safety, accurate incubation, durability and simplicity of operation are secured, and with such ends in view, my invention resides in the novel construction to be hereinafter specifically described and then claimed.

Reference will now be had to the drawing, wherein—

Figure 1 is a perspective view of the incubator partly broken away and partly in section;

Fig. 2 is a plan of the heating unit, partly broken away and partly in section; and Fig. 3 is a longitudinal sectional view of the same.

An incubator in accordance with this invention comprises a cabinet or housing having a base plate 1, end walls 2, a front wall 3, a rear wall 4 and a top plate 5. The walls 2, 3 and 4 and the top plate 5 are provided with inner linings or boards 6 of heat resisting material and interposed between the walls and the linings thereof is insulation material 7, as mineral wool.

The front wall 3 of the cabinet has an oblong doorway 8 normally closed by a hinged door 9 having a transparent panel 10, said door being retained in a closed position by holdfast devices 11 of a conventional form.

The bottom plate 1 and the rear wall 4 have ventilating openings 12 and 13 respectively, and on the bottom plate 1 are end cleats 14 supporting a burlap nursery tray 15.

The linings of the end walls 2 are provided with cleats 16 supporting an egg tray 17 and this tray may be of any desired egg capacity.

Suspended from the lining 6 of the top plate 7 by a plurality of hangers 18 and 19 is a flat rectangular heating unit above the egg tray 17 and of sufficient area to produce a heat radiation toward each egg in the tray. The hangers 18 and 19 are in the form of bolts and nuts provided with suitable insulation and the hangers 18 serve functionally as binding posts for leading in wires 20 which are associated with a thermostat, switch and suitable source of electrical energy, these elements not being shown as they may be of various forms and types forming no part of my invention.

The heating unit comprises a metallic pan 21, preferably made of zinc, said pan having inturned edges 22 retaining asbestos boards or sheets 23 and resistant coils 24 in the pan. A plurality of resistance coils are employed and connected in series, the resistance coils being sandwiched between the asbestos boards or sheets 23 and each coil wound upon a strip of insulation, as mica or asbestos.

After turning on the current and placing the heating unit in operation, the incubator requires no further attention on the part of the operator, other than the ordinary care of the eggs, such as turning and airing as nature demands for the development of the embryo. It is therefore apparent that I have devised a simple, reliable, clean and efficient incubator requiring the least possible attention from an operator and can be justly styled an "electrohatcher." The incubator possesses many other advantages that will be apparent to those skilled in the incubation and brooding of chicks and while in the drawing there is illustrated a preferred embodiment of my invention, it is to be understood that the structural elements are susceptible to such changes as fall within the scope of the appended claim.

What I claim is:—

In an incubator, an electric heating unit, adapted for suspension from the top of the incubator, comprising a metallic pan having flanged edges, sheets of insulation in said pan held by the flanged edges thereof, a plurality of resistance coils arranged in series and sandwiched between said sheets of insulation, said resistance coils having terminals at one end of the pan at the front and rear edges thereof, metallic hangers at the end of said pan with two of said hangers serving as electrical connectors for the terminals of said coils and some of the resistance coils shortened to provide clearance for the other end hangers, and a hanger centrally of said pan and between resistance coils thereof.

In testimony whereof I affix my signature in presence of two witnesses.

MAX K. MILLER.

Witnesses:
KARL H. BUTLER,
ANNA M. DORR.